(12) United States Patent
Sato et al.

(10) Patent No.: US 9,632,191 B2
(45) Date of Patent: Apr. 25, 2017

(54) SOUND SOURCE DETECTION DEVICE

(75) Inventors: Jun Sato, Susono (JP); Ryuji Funayama, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/637,858

(22) PCT Filed: Sep. 20, 2011

(86) PCT No.: PCT/JP2011/071385
§ 371 (c)(1),
(2), (4) Date: Sep. 27, 2012

(87) PCT Pub. No.: WO2013/042201
PCT Pub. Date: Mar. 28, 2013

(65) Prior Publication Data
US 2014/0204714 A1 Jul. 24, 2014

(51) Int. Cl.
*G08G 1/00* (2006.01)
*G01V 1/00* (2006.01)
*G01S 3/808* (2006.01)
*G01S 3/86* (2006.01)
(Continued)

(52) U.S. Cl.
CPC .............. *G01V 1/001* (2013.01); *G01S 3/808* (2013.01); *G01S 3/86* (2013.01); *G08G 1/166* (2013.01); *H04R 3/005* (2013.01); *H04R 2201/401* (2013.01); *H04R 2430/21* (2013.01); *H04R 2499/13* (2013.01)

(58) Field of Classification Search
CPC ............ G01S 3/808; G01S 3/86; G08G 1/166
See application file for complete search history.

(56) References Cited

U.S. PATENT DOCUMENTS 2,368,953 A * 2/1945 Walsh .................... F42B 21/00
114/20.1
7,653,487 B2 * 1/2010 Okuda ........................ 701/301
8,027,761 B1 * 9/2011 Nelson ............................ 701/23
(Continued)

FOREIGN PATENT DOCUMENTS

JP 56-174068 U 12/1981
JP 2-147978 A 6/1990
(Continued)

*Primary Examiner* — Luke Ratcliffe
*Assistant Examiner* — Hovhannes Baghdasaryan
(74) *Attorney, Agent, or Firm* — Sughrue Mion, PLLC

(57) ABSTRACT

Disclosed is a sound source detection device 1 which compares information of sound collected by sound collectors 13, 14, 15, and 16 to detect a predetermined sound source. The sound source detection device 1 includes a target determination unit 22 which arranges sound collectors at the same distance from a noise source inside a mobile object to determine a detection-target region of a sound source, and a sound source detection unit 25 which detects the direction of the predetermined sound source using information of sound of the detection-target region determined by the target determination unit 22. Accordingly, the sound source detection unit 25 does not determine sound input to the sound collectors 13, 14, 15, and 16 at the same timing as a detection target, making it possible to eliminate the influence of a noise source other than a sound source inside the mobile object in advance.

5 Claims, 10 Drawing Sheets

(51) Int. Cl.
*G08G 1/16* (2006.01)
*H04R 3/00* (2006.01)

(56) References Cited

U.S. PATENT DOCUMENTS

| | | | |
|---|---|---|---|
| 8,120,993 B2* | 2/2012 | Amada | 367/124 |
| 8,174,934 B2* | 5/2012 | Li et al. | 367/129 |
| 8,798,905 B2* | 8/2014 | Yoshioka et al. | 701/300 |
| 2004/0015282 A1* | 1/2004 | Babala | G01L 15/00 701/70 |
| 2005/0154503 A1* | 7/2005 | Jacobs | 701/1 |
| 2009/0207694 A1* | 8/2009 | Guigne et al. | 367/127 |
| 2010/0060441 A1* | 3/2010 | Iwamoto | 340/435 |
| 2010/0142327 A1* | 6/2010 | Kepesi et al. | 367/124 |
| 2010/0208902 A1 | 8/2010 | Yoshizawa et al. | |
| 2010/0290635 A1* | 11/2010 | Shridhar et al. | 381/71.1 |
| 2010/0329479 A1 | 12/2010 | Nakadai et al. | |
| 2011/0157300 A1* | 6/2011 | Solvang | 348/14.16 |
| 2011/0175755 A1* | 7/2011 | Yoshioka et al. | 340/995.1 |

FOREIGN PATENT DOCUMENTS

| | | |
|---|---|---|
| JP | 5-92767 U | 12/1993 |
| JP | 2005-234246 A | 9/2005 |
| JP | 2010-8250 A | 1/2010 |
| JP | 2010-85120 A | 4/2010 |
| JP | 2010-281816 A | 12/2010 |

* cited by examiner

Fig.4
(a)
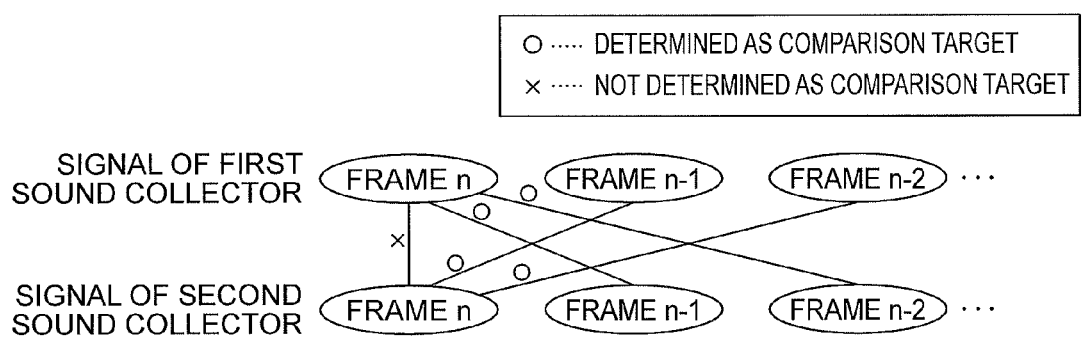
(b)
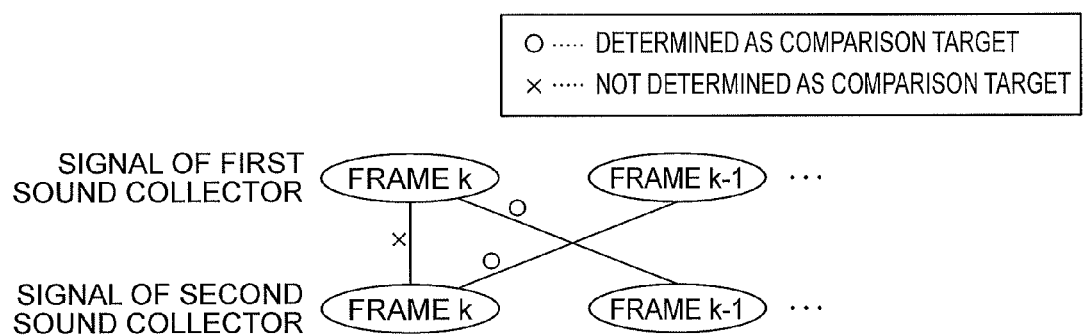

Fig.9
(a)
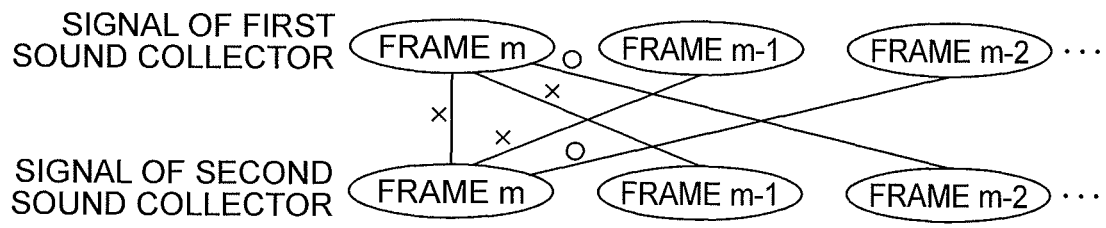
(b)
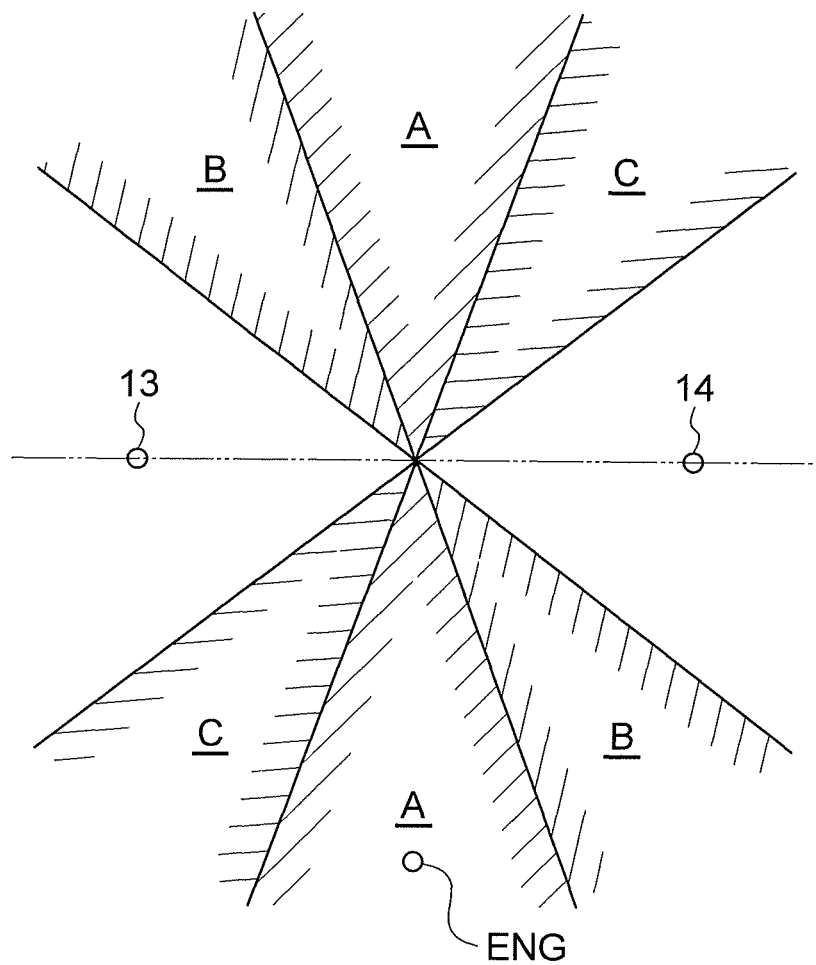

SOUND SOURCE DETECTION DEVICE

CROSS REFERENCE TO RELATED APPLICATIONS

This application is a National Stage of International Application No. PCT/JP2011/071385, filed on Sep. 20, 2011, the contents of all of which are incorporated herein by reference in their entirety.

TECHNICAL FIELD

The present invention relates to a sound source detection device which detects a sound source on the basis of sound collected by a plurality of sound collectors.

BACKGROUND ART

In a sound source detection device, a plurality of sound collectors collect surrounding sound, and the position of a sound source (particularly, traveling sound of a vehicle) is specified on the basis of an arrival time interval of sound. In a device described in Japanese Unexamined Utility Model Application Publication No. 5-92767, the frequency components in the low-frequency band and the high-frequency band are removed from electrical signals output from a plurality of microphones arranged at a predetermined interval to convert the electrical signals to corrected electrical signals, and power in a predetermined frequency band in which the characteristics of the traveling sound of the vehicle appear is calculated from the corrected electrical signals. When the power level is greater than a predetermined value, it is determined that there is an approaching vehicle, and unwanted noise components are removed from the corrected electrical signals to convert the corrected electrical signals to noise-suppressed signals. The cross-correlation between noise-suppressed signals of the plurality of microphones is calculated, and the approaching direction of the approaching vehicle is calculated from the arrival time interval at which the correlation is maximized.

CITATION LIST

Patent Literature

[Patent Literature 1] Japanese Unexamined Utility Model Application Publication No. 5-92767

SUMMARY OF INVENTION

Technical Problem

According to the above-described technique, while the direction of an approaching vehicle can be detected, for example, sound emitted from a host vehicle, such as an engine or a cooling fan is also detected. Accordingly, since sound becomes noise, there is a problem in that erroneous detection often occurs and detection precision cannot be improved.

Accordingly, an object of the invention is to provide a sound source detection device which is capable of reducing erroneous detection and improving detection precision.

Solution to Problem

That is, a sound source detection device according to the invention includes a plurality of sound collectors which are provided in a mobile object, and a sound source detection unit which compares information of sound collected by the plurality of sound collectors to detect the direction of a predetermined sound source. The plurality of sound collectors are arranged at the same distance from a noise source inside the mobile object, and the sound source detection unit does not determine sound input to the plurality of sound collectors at the same timing as a detection target.

In the sound source detection device according to the invention, the sound collectors are arranged at the same distance from the noise source, sound input to the plurality of sound collectors at the same timing is not determined as a detection target, and the position of the predetermined sound source is detected using only sound input at different timings. Therefore, it becomes possible to eliminate the influence of sound emitted from a noise source at the same distance from the sound collectors in advance, thereby reducing erroneous detection and improving detection precision.

The sound source detection device according to the invention may further include an another-vehicle detection unit which detects another vehicle around. The sound source detection unit may not determine sound input from the detection range of the another-vehicle detection unit as a detection target. In this case, since the detection-target region for sound source detection is narrowed, it is possible to further increase detection precision and to reduce the processing burden of the sound source detection process.

In the sound source detection device according to the invention, the sound source detection unit may determine sound input from the undetectable range of the another-vehicle detection unit as a detection target. In this case, it is possible to perform sound source detection at a place where detection by the another-vehicle detection unit is impossible and sound source detection is required.

In the sound source detection device according to the invention, the sound source detection unit may not determine sound input from a front direction when viewed from the mobile object as a detection target, and may determine sound input from a left-right direction when viewed from the mobile object as a detection target. In this case, the front direction in which sound source detection is not required is excluded from a detection target, and the left-right direction which tends to be a blind area is included in a detection target, thereby performing an optimum sound source detection process.

Advantageous Effects of Invention

According to the invention, it is possible to provide a sound source detection device which is capable of reducing erroneous detection and improving detection precision.

BRIEF DESCRIPTION OF DRAWINGS

FIG. 4 is a diagram illustrating a method of determining a detection region using a frame.

FIG. 9 is a diagram illustrating a process for determining a detection-target region in the sound source detection device of the second embodiment. FIG. 9(a) is a diagram showing a process for determining a detection-target region using a frame, and FIG. 9(b) is a diagram showing a detection-target region.

DESCRIPTION OF EMBODIMENTS

Figure 1:
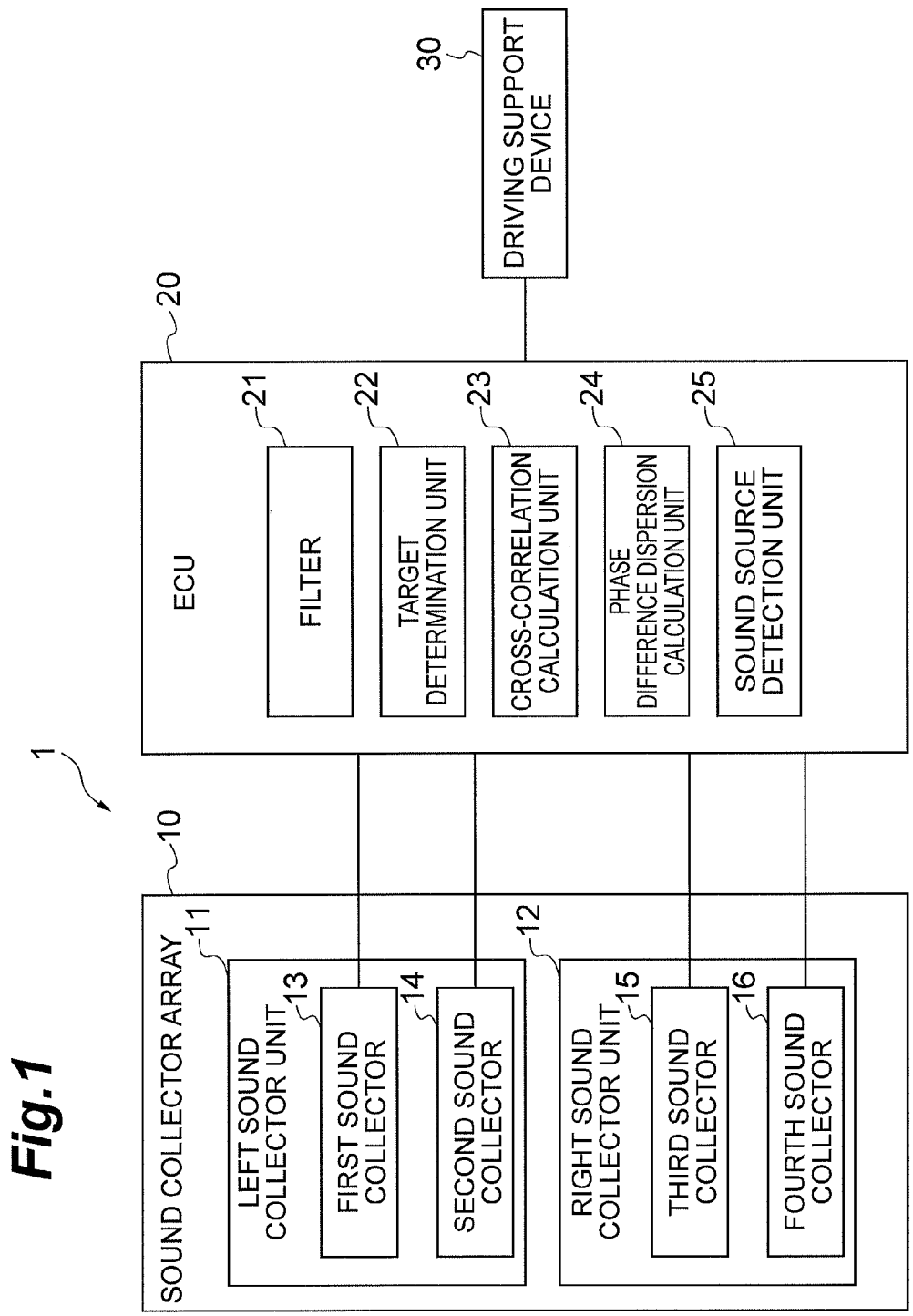
FIG. 1 is a schematic configuration diagram of a sound source detection device according to a first embodiment of the invention.

Hereinafter, a sound source detection device according to an embodiment of the invention will be described with reference to the drawings. In the respective drawings, the same or corresponding elements are represented by the same reference numerals, and overlapping description will be omitted.

A sound source detection device of this embodiment is mounted in a vehicle to detect the direction of an approaching vehicle. Specifically, the sound source detection device of this embodiment detects an approaching vehicle on the basis of sound collected by a plurality of sound collectors (microphones) (that is, specifies the moving direction of a sound source of traveling sound of a peripheral vehicle), and provides information relating to the detected approaching vehicle to the driving support device. This embodiment includes first to third embodiments in which the constituent elements and the processing forms of the sound source detection device are different from each other.

Examples of traveling sound of a vehicle primarily include road noise (frictional noise of the tire surface of the road surface) and pattern noise (air vortex (compression/release) in a tire groove). The range of a frequency component of traveling sound of a vehicle may be measured in advance by experiment or the like.

First, a sound source detection device 1 of a first embodiment will be described with reference to FIG. 1. FIG. 1 is a configuration diagram of the sound source detection device of the first embodiment.

The sound source detection device 1 has four sound collectors, and sound collector units each having two sound collectors (a sound collector pair) are arranged on the left and right sides in the vehicle width direction. In the sound source detection device 1, sound source detection is performed using the interval between the two sound collectors in each sound collector unit. The sound source detection device 1 includes a sound collector array 10 (left sound collector unit 11 (first sound collector 13 and second sound collector 14) and right sound collector unit 12 (third sound collector 15 and fourth sound collector 16)), and an ECU [Electronic Control Unit] 20 (filter 21, target determination unit 22, cross-correlation calculation unit 23, phase difference dispersion calculation unit 24, and sound source detection unit 25).

The sound collector array 10 has a left sound collector unit 11 and a right sound collector unit 12. The left sound collector unit 11 has a first sound collector 13 and a second sound collector 14. The first sound collector 13 is arranged on the outside of the left side in the vehicle width direction. The second sound collector 14 is arranged at the center of the vehicle at a predetermined interval from the first sound collector 13. The right sound collector unit 12 has a third sound collector 15 and a fourth sound collector 16. The fourth sound collector 16 is arranged on the outside of the right side in the vehicle width direction. The third sound collector 15 is arranged at the center of the vehicle at a predetermined interval from the fourth sound collector 16. In order to improve noise resistance performance, the sound collectors in each of the sound collector units 11 and 12 are arranged at a narrow interval.

Each of the sound collectors 13, 14, 15, and 16 has a function as an acoustic-electric transducer, converts collected sound to an electrical signal, and transmits the electrical signal to the ECU 20. As each of the sound collectors 13, 14, 15, and 16, a nondirectional sound collector is preferably used.

Figure 2:
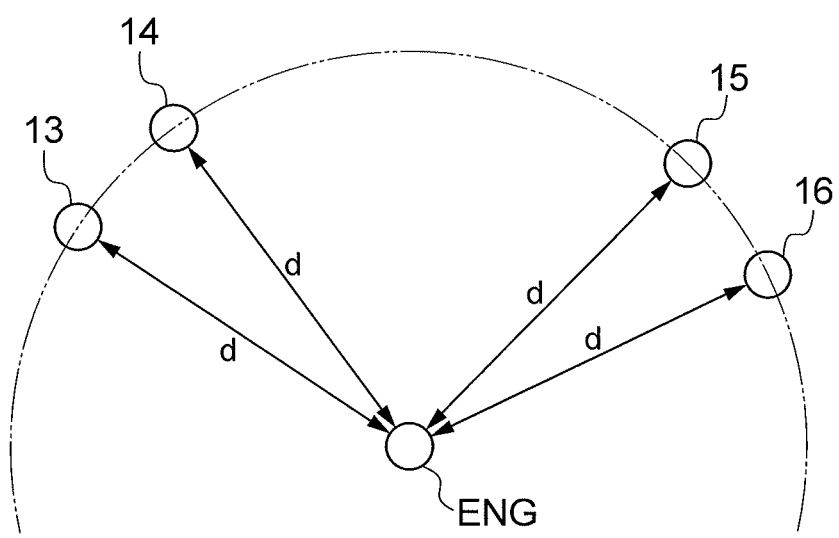
FIG. 2 is a diagram showing the arrangement of sound collectors in the sound source detection device.

As shown in FIG. 2, each of the sound collectors 13, 14, 15, and 16 is arranged at a distance d from an engine ENG which is a noise source and not the detection target of the sound source detection device 1. In this way, the sound collectors 13, 14, 15, and 16 are arranged at the same distance from the engine ENG.

The ECU 20 is an electronic control unit which has a CPU [Central Processing Unit], a ROM [Read Only Memory], a RAM [Random Access Memory], and the like, and performs overall control of the sound source detection device 1. In the ECU 20, applications for an approaching vehicle stored in the ROM are loaded on the ROM and executed on the CPU. As shown in FIG. 1, the ECU 20 has a filter 21, a target determination unit 22, a cross-correlation calculation unit 23, a phase difference dispersion calculation unit 24, and a sound source detection unit 25. The filter 21, the target determination unit 22, the cross-correlation calculation unit 23, the phase difference dispersion calculation unit 24, and the sound source detection unit 25 correspond to the above-described applications.

Figure 3:
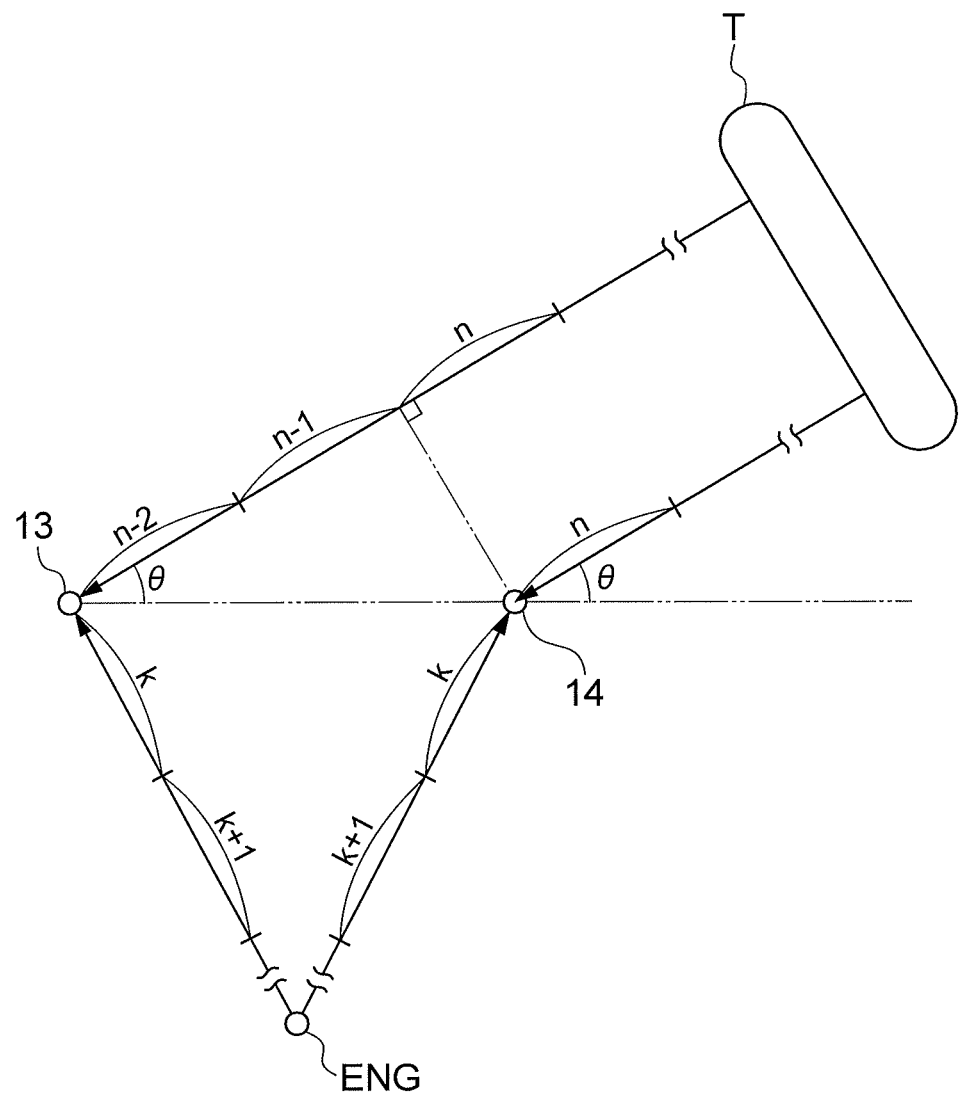
FIG. 3 is a diagram illustrating a process for determining the direction of a sound source.

Next, the outline of a sound source detection function in the ECU 20 will be described. Sound source detection by the ECU 20 is performed in each of the sound collector units 11 and 12. Hereinafter, description will be provided as to the example of the left sound collector unit 11 (first sound collector 13 and second sound collector 14). As shown in FIGS. 3 and 4, the ECU 20 segments the electrical signal corresponding to sound collected by each of the sound collectors 13 and 14 in time series in terms of frames, and determines whether or not the waveform of the electrical signal is similar in every segmented frame. Specifically, it is determined whether or not the electrical signal of a frame n (where n is an integer equal to or greater than 3) corresponding to sound collected by the second sound collector 14 is similar in waveform to the electrical signals of frames n-1, n-2, . . . , and n-i (where is an integer smaller than n) corresponding to sound collected by the first sound collector 13.

For example, as shown in FIG. 3, when the waveform of the frame n corresponding to sound collected by the second sound collector 14 is similar to the waveform of the frame n-2 corresponding to sound collected by the first sound collector 13, the ECU 20 detects that a sound source T is in a direction at an angle θ relative to a line connecting the first sound collector 13 and the second sound collector 14. In this way, it becomes possible to detect the direction of the predetermined sound source T.

Figure 5:
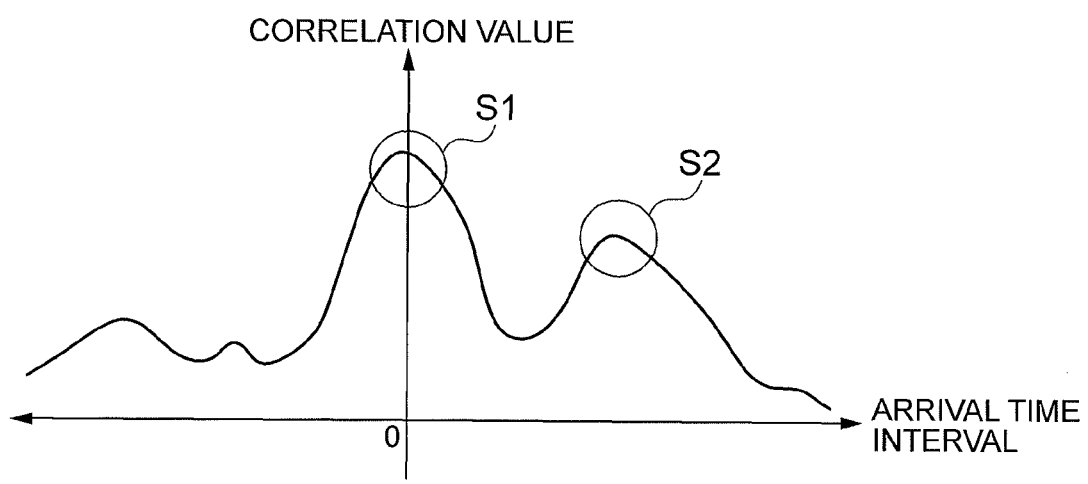
FIG. 5 is a graph showing the relation between an arrival time interval of sound collected by the sound collectors and the correlation thereof.

As shown in FIG. 4, the ECU 20 is configured to appropriately determine which frames are subjected to waveform comparison. In particular, the first embodiment has a feature in that waveform comparison between the frames of the same number is not performed. That is, in a case shown in FIG. 3, the electrical signal of a frame k (where k is an integer equal to or greater than 2) corresponding to sound collected by the first sound collector 13 and the electrical signal of a frame k corresponding to sound collected by the second sound collector 14 are determined as a comparison target. In other words, for example, as shown in FIG. 5, comparison between waveforms S1 when the time interval of sound arrived at the sound collectors 13 and 14 is close to 0 is not performed between the sound collectors 13 and 14, and comparison between waveforms (for example, waveforms S2) when the time interval is not close to 0 is performed.

Figure 6:
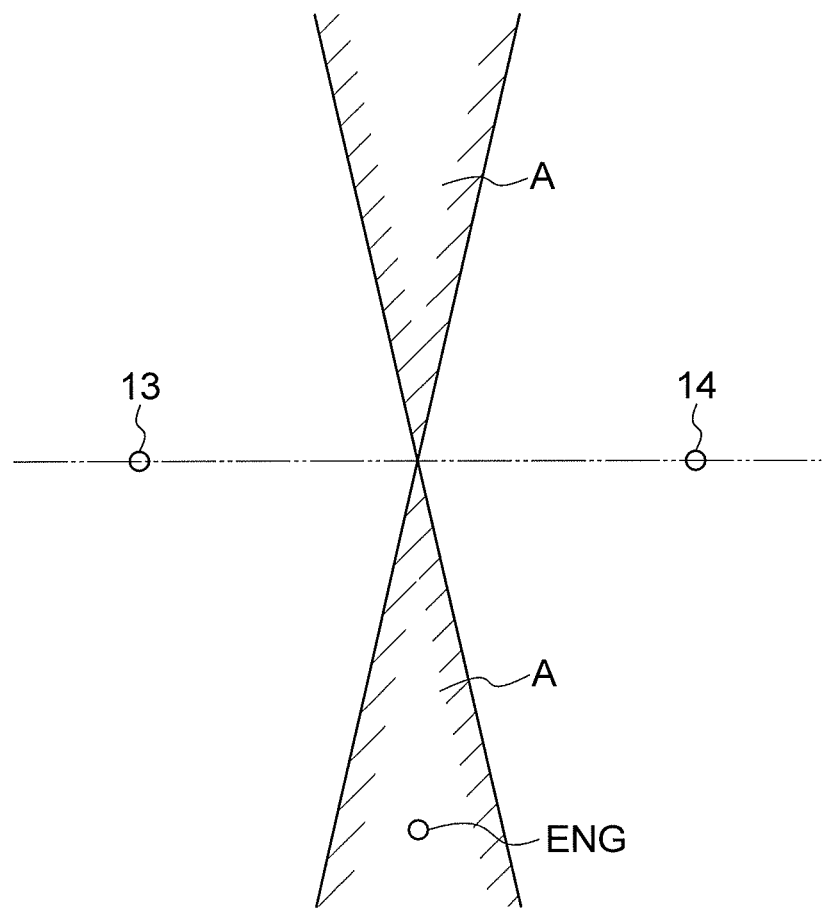
FIG. 6 is a diagram showing a detection-target region for sound source detection detected by a target determination unit.

In this way, waveform comparison between the frames of the same number is not performed, such that, as shown in FIG. 6, a region A where the distance from the first sound collector 13 is substantially the same as the distance from the second sound collector 14 is excluded from a detection-target region for sound source detection. The engine ENG which is a noise source is included in the region A. Similarly to between the first sound collector 13 and the second sound collector 14, a detection-target region determination process is also performed between the third sound collector 15 and the fourth sound collector 16. On this premise, the respective constituent elements in the ECU 20 will be hereinafter described.

The filter 21 removes a predetermined frequency band from the electrical signals obtained from the sound collectors 13, 14, 15, and 16. In the filter 21, each time the electrical signals are input from the sound collectors 13, 14, 15, and 16, frequency bands higher and lower than a band sufficiently including the frequency band of traveling sound of the vehicle are removed from the input electrical signals. With this filtering, only electrical signals in a frequency band in which the characteristics of the traveling sound of the vehicle satisfactorily appear is output.

The target determination unit 22 performs frame segmentation of the electrical signals of the two sound collectors filtered by the filter 21 for each sound collector pair (left sound collector unit 11 and right sound collector unit 12) and determines which frames are a detection target such that waveform comparison between frames other than the frames of the same number is performed. Only the waveforms of the frames determined by the target determination unit 22 are processed by the cross-correlation calculation unit 23, the phase difference dispersion calculation unit 24, and the sound source detection unit 25 described below, such that sound input to the sound collectors 13, 14, 15, and 16 at the same timing is not determined as a detection target.

In the cross-correlation calculation unit 23, for each sound collector pair (left sound collector unit 11 and right sound collector unit 12), the cross-correlation value between the electrical signals of the two sound collectors determined as a comparison target by the target determination unit 22 is calculated. Specifically, the correlation value representing how much the electrical signals of the sound collector pair are similar to each other (how close the waveforms are to each other). In this case, the cross-correlation value between the electrical signals of the first sound collector 13 and the second sound collector 14 of the left sound collector unit 11 and the cross-correlation value between the electrical signals of the third sound collector 15 and the fourth sound collector 16 of the right sound collector unit 12 are calculated.

In the phase difference dispersion calculation unit 24, if the cross-correlation value is calculated by the cross-correlation calculation unit 23 for each sound collector pair of the sound collector units 11 and 12, the phase difference between the electrical signals of the two sound collectors is calculated. In the phase difference dispersion calculation unit 24, the dispersion (variation) of the phase difference is calculated using the phase difference calculated at a given time interval.

When calculating the cross-correlation value or the phase difference, for example, calculation is performed using a cross-correlation function or frequency information which can be obtained by Fourier transform.

The sound source detection unit 25 has a function of detecting the direction of a predetermined sound source of an approaching vehicle or the like. In the sound source detection unit 25, for the sound collector pair of each of the sound collector units 11 and 12, a sound source which is continuously present is detected on the basis of the cross-correlation value and the dispersion of the phase difference. In this case, it is determined whether or not the cross-correlation value is equal to or greater than a threshold value (for cross-correlation determination), and it is determined whether or not sound collected by the sound collector pairs is similar sound. The threshold value (for cross-correlation determination) is the threshold value which is used to determine whether or not the waveforms of the electrical signals are similar to each other from the cross-correlation value, and is set in advance by experiment or the like. It is determined whether or not the dispersion of the phase difference is equal to or smaller than a threshold value (for phase difference dispersion determination), and it is determined whether or not sound collected by the sound collector pair is continuously present at a certain point. The threshold value (for phase difference dispersion determination) is a threshold value which is used to determine whether or not a sound source is continuously present at a certain position from the phase difference dispersion, and is set in advance by experiment or the like. When the cross-correlation value is equal to or greater than the threshold value (for cross-correlation value determination) and the phase difference dispersion is equal to or smaller than the threshold value (for phase difference dispersion determination), it is determined that the sound source is continuously present. When this condition is not satisfied, it is determined that no sound source is present.

The driving support device 30 is a device which provides various kinds of driving support to a driver. In particular, the driving support device 30 receives approaching vehicle information from the sound source detection device 1, and performs driving support relating to the approaching vehicle at this time. For example, when there is a vehicle which approaches the host vehicle, a possibility that the approaching vehicle will collide with the host vehicle is determined. When it is determined that there is a possibility of collision, a warning is output or information of the approaching vehicle is provided to the driver. When there is a high possibility of collision, vehicle control, such as automatic braking, is performed.

Figure 7:
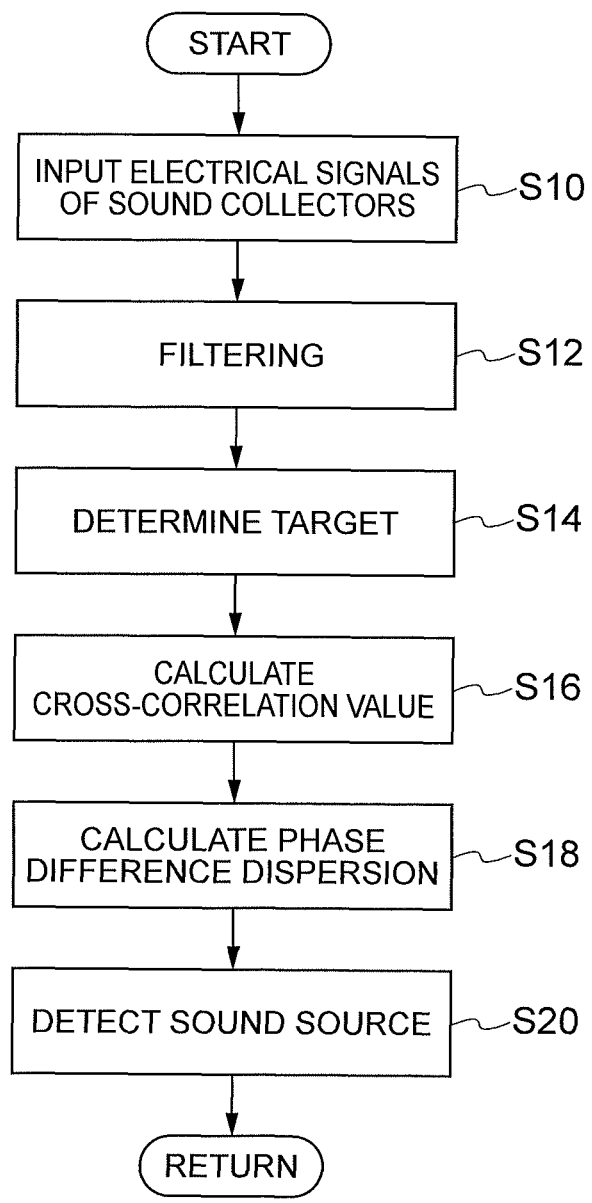
FIG. 7 is a flowchart showing a sound source detection process in the sound source detection device of the first embodiment.

Next, the operation of the sound source detection device 1 will be described with reference to FIG. 7. FIG. 7 is a flowchart showing the flow of a process in the ECU 20 of the sound source detection device 1 of the first embodiment. A sequence of steps shown in FIG. 7 is repeatedly performed in a cycle set in advance by the ECU 20. This sequence of steps is performed in each of the sound collector units 11 and 12. Specifically, by comparison between sound collected by the first sound collector 13 and sound collected by the second sound collector 14 and between sound collected by the third sound collector 15 and sound collected by the fourth sound collector 16, the direction of the predetermined sound source is detected. Hereinafter, an operation for sound source detection by comparison between sound collected by the first sound collector 13 and sound collected by the second sound collector 14 will be described. Separately from the sequence of steps of the flowchart, in each of the sound collectors 13, 14, 15, and 16, sound outside the vehicle is collected, the collected sound is converted to an electrical signal, and the electrical signal is transmitted to the ECU 20.

The control process of the flowchart starts, for example, when the ignition of the vehicle is turned on. First, in Step S10 (Hereinafter, referred to as "S10". The same applies to other steps.), the electrical signals from the sound collectors 13, 14, 15, and 16 are input to the ECU 20. In S12, a filtering process is performed by the filter 21. At this time, components in a high-frequency band and a low-frequency band are removed from the electrical signal.

In S14, the electrical signal (hereinafter, referred to as a first signal) of sound collected by the first sound collector 13 and the electrical signal (hereinafter, referred to as a second signal) of sound collected by the second sound collector 14 are segmented into frames by the target determination unit 22, and frames of the first signal and the second signal as a comparison target, that is, the detection-target region of the sound source is determined.

Next, in S16, the cross-correlation value of sound obtained from the detection-target region determined by the target determination unit 22 is calculated by the cross-correlation calculation unit 23. In S18, the phase difference dispersion between the electrical signals of sound obtained from the detection-target region of the first signal and the second signal is calculated by the phase difference dispersion calculation unit 24. In S20, the presence/absence of a sound source and the direction of the sound source are determined by the sound source detection unit 25 using the cross-correlation value and the value of the phase difference dispersion between the electrical signals of the first signal and the second signal, and the sequence of steps ends.

As described above, in the sound source detection device 1 of the first embodiment, the sound collectors 13 and 14 are arranged at the same distance from the engine ENG, and comparison between electrical signals when the time interval of sound arrived at the sound collectors 13 and 14 is close to 0 is not performed between the sound collectors 13 and 14. That is, the sound source detection unit 25 does not determine sound input to the sound collectors 13 and 14 at the same timing as a detection target, and excludes sound emitted from the engine ENG, which is a noise source, from the detection target for sound source detection. Therefore, since it is possible to eliminate the influence of noise, it is possible to increase detection precision of sound of a detection target outside the vehicle, such as an approaching vehicle, to reduce erroneous detection, and to improve detection performance. The noise source is not limited to the engine ENG and may be, for example, a cooling fan or the like.

Figure 8:
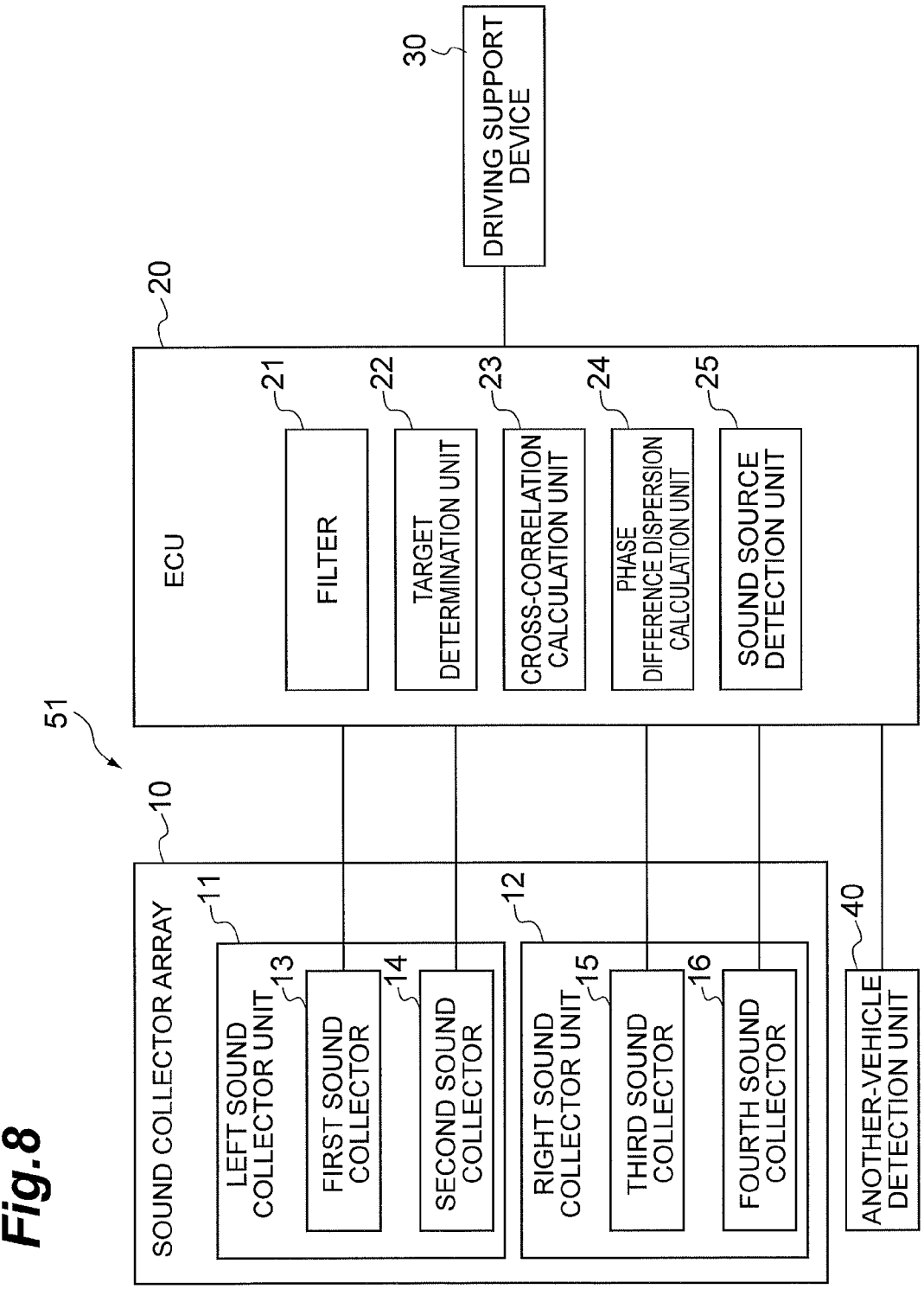
FIG. 8 is a schematic configuration diagram of a sound source detection device according to second and third embodiments of the invention.

Next, a sound source detection device 51 of a second embodiment will be described. The second embodiment has a feature in that, as shown in FIG. 8, an another-vehicle detection unit 40 which detects another vehicle is further provided, and a sound source detection device 51 excludes the detection range of the another-vehicle detection unit 40 from a detection target of a sound source.

The another-vehicle detection unit 40 is a device which can recognize the surrounding environment. For example, a camera or a laser range finder may be used. The another-vehicle detection unit 40 detects whether or not there is another vehicle around the host vehicle, and outputs the detection result to the ECU 20 as a detection signal. The detection range of the another-vehicle detection unit 40 (for example, the angle of view of the camera) includes a region A, a region B, and a region C shown in (b) of FIG. 9.

The target determination unit 22 determines the detection-target region for sound source detection such that waveform comparison between the frames of the same number is not performed and also, for example, as shown in (a) of FIG. 9, determination on whether or not the electrical signal of a frame m (where m is an integer equal to or greater than 3) corresponding to sound collected by the first sound collector 13 is similar in waveform to the signals of frames m and m-1 corresponding to sound collected by the second sound collector 14 is not performed. In this way, waveform comparison is not performed between the frames of the same number and between the frames of previous and subsequent numbers, such that, as a shown in (b) of FIG. 9, not only the region A but also the region B and the region C on the left and right sides of the region A are excluded from the sound source detection-target region.

As described above, in the second embodiment, the engine ENG which is a noise source is excluded from a sound source detection target, and the detection range of the another-vehicle detection unit 40 is not determined as a detection target. Therefore, it is possible to further reduce erroneous detection and to further increase detection precision. It is also possible to reduce the burden of the sound source detection process by the ECU 20.

Hereinafter, a sound source detection device of a third embodiment will be described with reference to FIG. 10. The third embodiment has the same configuration as the sound source detection device 51 of the second embodiment, and has a feature in that a region which cannot be detected by the another-vehicle detection unit 40 is determined as a detection target for sound source detection.

Figure 10:
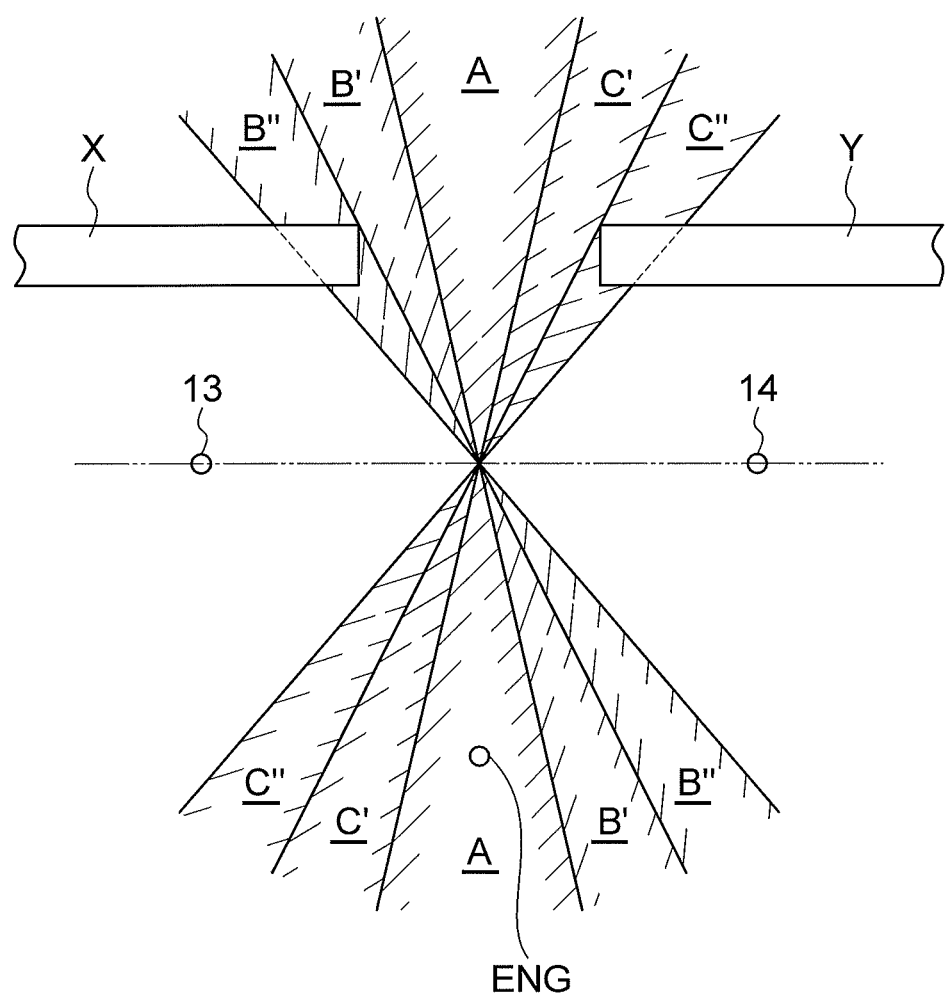
FIG. 10 is a diagram illustrating a detection-target region determined in a sound source detection device of a third embodiment.

Specifically, as shown in FIG. 10, for example, when obstacles X and Y are in front of the first sound collector 13 and the second sound collector 14, and another vehicle ahead of the obstacles X and Y cannot be detected by the another-vehicle detection unit 40, the target determination unit 22 determines the detection-target region such that regions B' and C' which are the detectable range of the another-vehicle detection unit 40 are excluded from the sound source detection-target region, and regions B" and C" which are hidden behind the obstacles X and Y and the undetectable range of the another-vehicle detection unit 40 are included in the sound source detection-target region.

As described above, although in the third embodiment, similarly to the second embodiment, the detection range of the another-vehicle detection unit 40 is not determined as a detection target, the undetectable range of the another-vehicle detection unit 40 is determined as a sound source detection target. Therefore, it is possible to eliminate the influence of a noise source, such as the engine ENG to improve detection precision of the sound source, and to determine the undetectable region of the another-vehicle detection unit 40 as a sound source detection target because the obstacles X and Y are present, thereby reliably performing necessary sound source detection.

Although the first to third embodiments of the invention have been described, the invention is not limited to the first to third embodiments, and various modifications may be made.

For example, in the foregoing embodiments, an example where the sound collectors 13, 14, 15, and 16 are arranged at the same distance from the engine ENG which is a noise source, the region at the same distance from the sound collectors 13, 14, 15, and 16 is excluded from the detection-target region, thereby eliminating the influence of sound emitted from the engine ENG has been described. However, the invention is not limited to this example, and for example, the front direction when viewed from the vehicle may be excluded from the detection-target region, and the left-right direction of the vehicle may be included in the detection target. Accordingly, sound emitted from a region which enters the field of view of the driver and in which sound source detection is not required is excluded from the detection target, and the left-right direction which does not usually enter the field of view of the driver is included in the detection target, thereby performing an optimum sound source detection process.

Although in the foregoing embodiments, a process in which sound collected by the two sound collectors is segmented into frames, and the sound source detection-target region is determined by determining which frames should be used as a comparison target has been described, the invention is not limited thereto, the sound source detection-target region may be determined without using frame segmentation.

Although in the foregoing embodiments, an example where waveform comparison between the frames of the same number is not performed, such that sound input to the sound collectors at the same timing is not determined as a detection target, the term "same timing" is not limited to the corresponding time between the frames of the same number, and may be appropriately changed, for example, such that comparison between frames of adjacent numbers is not performed.

Although in the foregoing embodiments, the invention has been applied to the sound source detection device 1 or 51 which is mounted in the vehicle and provides information of the detected approaching vehicle to the driving support device 30, the sound source detection device 1 or 51 may have a different configuration. For example, an approaching vehicle detection function may be embedded in the driving support device, a warning function may be provided in the sound source detection device, or the sound source detection device may be embedded in a mobile object other than a vehicle.

Although in the foregoing embodiments, a configuration in which each of the left sound collector unit 11 and the right sound collector unit 12 has two sound collectors has been described, various variations may be applied as to the number of sound collectors or the positions where the sound collectors are arranged.

REFERENCE SIGNS LIST 1, 51: sound source detection device, 10: sound collector array, 11: left sound collector unit, 12: right sound collector unit, 13: first sound collector, 14: second sound collector, 15: third sound collector, 16: fourth sound collector, 20: ECU, 21: filter, 22: target determination unit, 23: cross-correlation calculation unit, 24: phase difference dispersion calculation unit, 25: sound source detection unit, 30: driving support device, 40: another-vehicle detection unit, ENG: engine (noise source).

The invention claimed is:

1. A sound source detection device mounted in a mobile object comprising:
   a plurality of sound collectors,
      wherein a noise source is arranged inside the mobile object;
   and a sound source detection unit which
      divides a sound collected by each of the plurality of sound collectors into frames,
      identifies a similarity between the frames of different sound collectors, and
      detects a direction of a detection target based on the similarity of the frames,
   wherein the sound source detection unit identifies the frames simultaneously arriving to the plurality of sound collectors as being originated by the noise source based on the simultaneous time of arrival.

2. The sound source detection device according to claim 1, further comprising:
   a vehicle detection unit which detects a vehicle around in a predefined detection range,
   wherein the sound source detection unit determines sound input from a detection range of the vehicle detection unit as being originated by the noise source.

3. The sound source detection device according to claim 2,
   wherein the sound source detection unit determines sound input from a range of outside of the predetermined detection range of the vehicle detection unit as being originated by the detection target.

4. The sound source detection device according to claim 1,
   wherein the sound source detection unit determines sound input from a front direction when viewed from the mobile object as being originated by the noise source, and determines sound input from a left-right direction when viewed from the mobile object as being originated by the detection target.

5. The sound source detection device according to claim 1,
   wherein the plurality of sound collectors are arranged at the same distance from the noise source inside the mobile object.

* * * * *